(12) United States Patent
Agiwal et al.

(10) Patent No.: US 10,980,006 B2
(45) Date of Patent: Apr. 13, 2021

(54) METHOD AND APPARATUS FOR SIDELINK COMMUNICATION IN WIRELESS COMMUNICATION SYSTEM

(71) Applicant: Samsung Electronics Co., Ltd., Suwon-si (KR)

(72) Inventors: Anil Agiwal, Suwon-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 15/337,524

(22) Filed: Oct. 28, 2016

(65) Prior Publication Data

US 2017/0127405 A1    May 4, 2017

(30) Foreign Application Priority Data

Oct. 29, 2015    (IN) .......................... 5843/CHE/2015

(51) Int. Cl.
*H04W 72/04*    (2009.01)
*H04W 76/14*    (2018.01)
(Continued)

(52) U.S. Cl.
CPC ..... *H04W 72/0413* (2013.01); *H04W 72/048* (2013.01); *H04W 76/14* (2018.02); *H04W 72/14* (2013.01); *H04W 76/27* (2018.02)

(58) Field of Classification Search
CPC . H04W 76/14; H04W 72/0413; H04W 76/27; H04W 72/14; H04W 72/048
See application file for complete search history.

(56) References Cited

U.S. PATENT DOCUMENTS

2012/0106517 A1    5/2012    Charbit et al.
2013/0322413 A1    12/2013    Pelletier et al.
(Continued)

FOREIGN PATENT DOCUMENTS

| CN | 102334370 A | 10/2014 |
| CN | 104335654 A | 2/2015 |
| WO | 2015/021185 A1 | 2/2015 |

OTHER PUBLICATIONS

Intel Corporation, Open Aspects of Priority Handling for ProSe Communication, 3GPP TSG RAN WG2 Meeting #91b, Oct. 5-9, 2015, R2-154385, Malmo, Sweden.
(Continued)

*Primary Examiner* — Jeffrey M Rutkowski
*Assistant Examiner* — Chae S Lee
(74) *Attorney, Agent, or Firm* — Jefferson IP Law, LLP

(57) ABSTRACT

The present disclosure relates to fifth generation (5G) or pre-5G communication systems provided to support a higher data rate than that given by long term evolution (LTE) or other post-fourth generation (4G) communication systems. A method for performing a sidelink communication by a terminal is provided. The method includes sending, to a base station, a request for multiple grants for the sidelink communication and a first indicator indicating whether the terminal supports multiple transmissions of the sidelink communication to different destinations in a sidelink control (SC) period, receiving the multiple grants from the base station, and performing the multiple transmissions to the different destinations in the SC period.

20 Claims, 15 Drawing Sheets

(51) Int. Cl.
*H04W 76/27* (2018.01)
*H04W 72/14* (2009.01)

(56) References Cited

U.S. PATENT DOCUMENTS

| | | | |
|---|---|---|---|
| 2014/0329535 A1 | 11/2014 | Sadiq et al. | |
| 2016/0128082 A1* | 5/2016 | Chen | H04W 72/10 370/329 |
| 2016/0183276 A1* | 6/2016 | Marinier | H04W 72/02 370/329 |
| 2016/0242082 A1* | 8/2016 | Jung | H04W 72/042 |
| 2016/0338095 A1* | 11/2016 | Faurie | H04W 28/0278 |
| 2017/0006598 A1* | 1/2017 | Uemura | H04L 5/0048 |
| 2017/0094656 A1* | 3/2017 | Chen | H04W 72/0446 |
| 2017/0164381 A1* | 6/2017 | Kim | H04W 76/14 |
| 2017/0359835 A1* | 12/2017 | Seo | H04W 72/14 |
| 2018/0116007 A1* | 4/2018 | Yasukawa | H04W 28/06 |
| 2018/0139724 A1* | 5/2018 | Loehr | H04W 72/02 |

OTHER PUBLICATIONS

Nokia Networks, Sidelink Discovery Related Corrections, 3GPP TSG-RAN WG2 Meeting #91, Aug. 24-28, 2015, R2-153708, Beijing, China.
Kyocera, Multiple Transmissions to Different Destinations from the UE-to-Network Relay, 3GPP TSG RAN WG1 Meeting #82, Aug. 24-28, 2015, R1-154010, China, Beijing.
Indian Office Action dated Nov. 6, 2020 issued in Indian Application No. 5843/CHE/2015.
Chinese Office Action dated Oct. 30, 2020, issued in Chinese Application No. 201680063065.8.

* cited by examiner

METHOD AND APPARATUS FOR SIDELINK COMMUNICATION IN WIRELESS COMMUNICATION SYSTEM

CROSS-REFERENCE TO RELATED APPLICATION(S)

This application claims the benefit under 35 U.S.C. § 119(a) of an Indian patent application filed on Oct. 29, 2015 in the Indian Patent Office and assigned Serial number 5843/CHE/2015, the entire disclosure of which is hereby incorporated by reference.

TECHNICAL FIELD

The present disclosure relates to sidelink communication methods and apparatuses in wireless communication systems. More particularly, the present disclosure relates to sidelink communication methods and apparatuses for processing grants on side link communications.

BACKGROUND

In order to meet the demand for wireless data traffic soaring since the fourth generation (4G) communication system came to the market, there are ongoing efforts to develop enhanced fifth generation (5G) communication systems or pre-5G communication systems. The 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamfoming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the system including, e.g., hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The advent of smartphones led to a sharp increase in data traffic. As the population of using smartphones and application services through smartphones are likely to sharply grow up, mobile data traffic is anticipated to increase even more. In particular, if intelligent communications utilizing things come into play, such as communications between human beings and things or inter-thing communications, which are regarded as a brand-knew market as beyond communications between human beings, traffic forwarded to base stations may increase to the extent difficult for them to handle.

A noticeable technique to address such issues s direct inter-device communication technology. Such technology also called D2D communication or sidelink communication draws attention for both licensed bands used for cellular mobile communications and unlicensed bands used for Wi-Fi or other similar communications.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a grant processing method and apparatus enabling multiple transmissions to different destinations using multiple grants.

Another aspect of the present disclosure is to provide a grant processing method and apparatus enabling multiple transmissions to one destination using multiple grants.

Another aspect of the present disclosure is to provide a grant processing method and apparatus enabling a user equipment (UE) having a plurality of source identifications (IDs) to relay data using multiple grants.

In accordance with an aspect of the present disclosure, a method for performing a sidelink communication by a terminal is provided. The method includes sending, to a base station, a request for multiple grants for the sidelink communication and a first indicator indicating whether the terminal supports multiple transmissions of the sidelink communication to different destinations in a sidelink control (SC) period, receiving the multiple grants from the base station, and performing the multiple transmissions to the different destinations in the SC period.

In accordance with another aspect of the present disclosure, a method for processing a grant in a sidelink communication by a base station is provided. The method includes receiving, from a terminal, a request for multiple grants allowing the terminal to perform multiple transmissions for the sidelink communication and a first indicator indicating whether the terminal supports multiple transmissions of the sidelink communication to different destinations in a SC period, allocating the multiple grants for the terminal, and sending the multiple grants to the terminal.

In accordance with another aspect of the present disclosure, a terminal for performing a sidelink communication is provided. The terminal includes a transmitter configured to send, to a base station, a request for multiple grants for the sidelink communication and a first indicator indicating whether the terminal supports multiple transmissions of the sidelink communication to different destinations in a SC period, a receiver configured to receive the multiple grants from the base station, and at least one processor configured to perform the multiple transmissions to the different destinations in the SC period.

In accordance with another aspect of the present disclosure, a base station for performing a sidelink communication is provided. The base station includes a receiver configured to receive, from a terminal, a request for multiple grants allowing the terminal to perform multiple transmissions for the sidelink communication and a first indicator indicating whether the terminal supports multiple transmissions of the sidelink communication to different destinations in a SC period, at least one processor configured to allocate the multiple grants for the terminal, and a transmitter configured to send the multiple grants to the terminal.

According to the present disclosure, multiple grants all may be accommodated, preventing waste of sidelink communication resources.

According to the present disclosure, a UE may perform sidelink communication only when a grant is provided and may accommodate multiple grants, preventing unnecessary transmission attempt and transmission interruption for neighbor devices.

According to the present disclosure, an evolved node B (eNB) may send multiple grants only to UEs attempting multiple transmissions while allowing the UEs to perform sidelink communication, thereby allowing for efficient management of sidelink communication resources.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
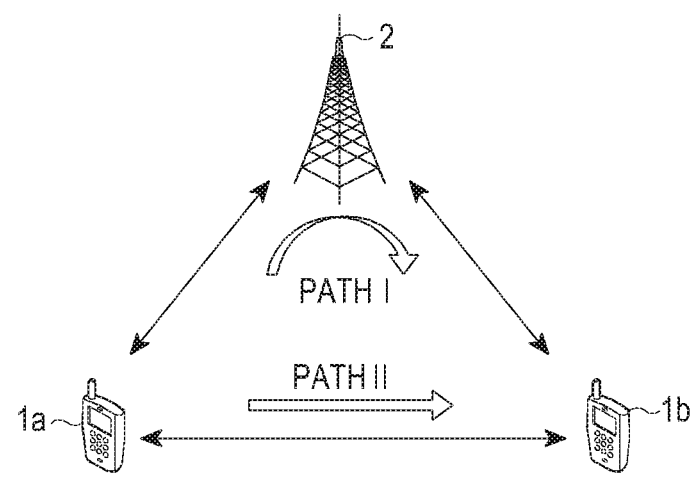
FIG. 1 is a view illustrating a concept of communication using a base station and sidelink communication according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Sidelink communication for enabling data communication services between user equipments (UEs) is being researched by communication standardization groups. During such sidelink communication, a transmitting IT may send data packets to a group of UEs, broadcast the data packets to all the UEs, or send unicast data packets to a particular LIE The sidelink communication between the transmitting IT and a receiving LT is essentially connnectionless. In other words, before the transmitting UE starts to send data packets, no link is established between the transmitting UE and the receiving UE, and no control messages are exchanged therebetween.

During transmission, the transmitting UE may include a source identifier and destination identifier in data packets. The source identifier may be set as the UE identification (ID) of the transmitting LTE. The destination identifier is an identifier for a receiving UE targeted for packet transmission. The destination identifier indicates whether the packet is a broadcast packet, unicast packet, or a packet intended for one group. For the broadcast packet, the destination identifier may be set as a broadcast group identifier. For the group cast packet, the destination identifier may be set as a group identifier of its intended group. For the unicast packet, the destination identifier may be set as the UE ID.

During the sidelink communication, a normal UE performs one sidelink transmission with another destination UE. For a sidelink transmission, a UE should receive a grant from an evolved node B (eNB). Meanwhile, the UE may perform multiple transmissions. The multiple transmissions may include simultaneously transmitting a plurality of data packets to several destinations or one or more transmitting single data packets to one destination over several times.

Thus, the UE needs to receive several grants. However, upon receiving several grants, the UE cannot perform efficient sidelink multiple transmissions under grant processing methods of the related art. Such approaches may delay transmissions to other destinations. Further, as per the approaches of the related art, during sidelink communication, the LIE may have multiple source IDs and may use only one sidelink grant to transmit one or more medium access control (MAC) protocol data units (PDUs) corresponding to the same source ID and destination IDs. Thus, the approaches of the related art may delay transmission of data along with other source IDs and/or destination IDs. To address the above issues, a need exists for a method enabling transmission using multiple sidelink grants. Hereinafter, preferred embodiments of the present disclosure are described in detail with reference to the accompanying drawings. The same reference denotations may be used to refer to the same or similar elements throughout the specification and the drawings. When making the gist of the present disclosure unclear, the detailed description of known functions or configurations is skipped. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

The base station (BS) is an entity communicating with a LE and may be denoted a nodeB (NB), eNB, or access point (AP).

The mobile station (MS) is an entity communicating with a base station and may be denoted a UE, mobile equipment (ME), device, or terminal.

Sidelink communication also known as device to device (D2D) communication is a direct communication scheme, meaning a technique enabling communication with other device within a short range without passing through a network infrastructure such as a base station. Sidelink communication is long term evolution (LTE)-based direct communication.

FIG. 1 is a view illustrating a concept of communication using a base station and sidelink communication according to an embodiment of the present disclosure.

FIG. 1 illustrates a method in which a UE 1*a* communicates with another UE 1*b*.

Wireless communication may include network communication and direct communication depending on whether a network comes in use. The network communication uses a network while the direct communication uses wireless connections for neighboring user devices. For example, Bluetooth communication and sidelink communication may be direct communication methods.

The UE 1*a* may communicate with the other UE 1*b* via an eNB 2. Path I may represent a path through which data is transmitted in the network communication. Further, the UE 1*a* may directly communicate with the other UE 1*b*. The UE 1*a* may perform sidelink communication with the other UE 1*b*. Path II represents a path through data transmitted in the sidelink communication. The sidelink communication may provide two types of proximity based services (ProSe), i.e., direct discovery and direct communication.

Figure 2:
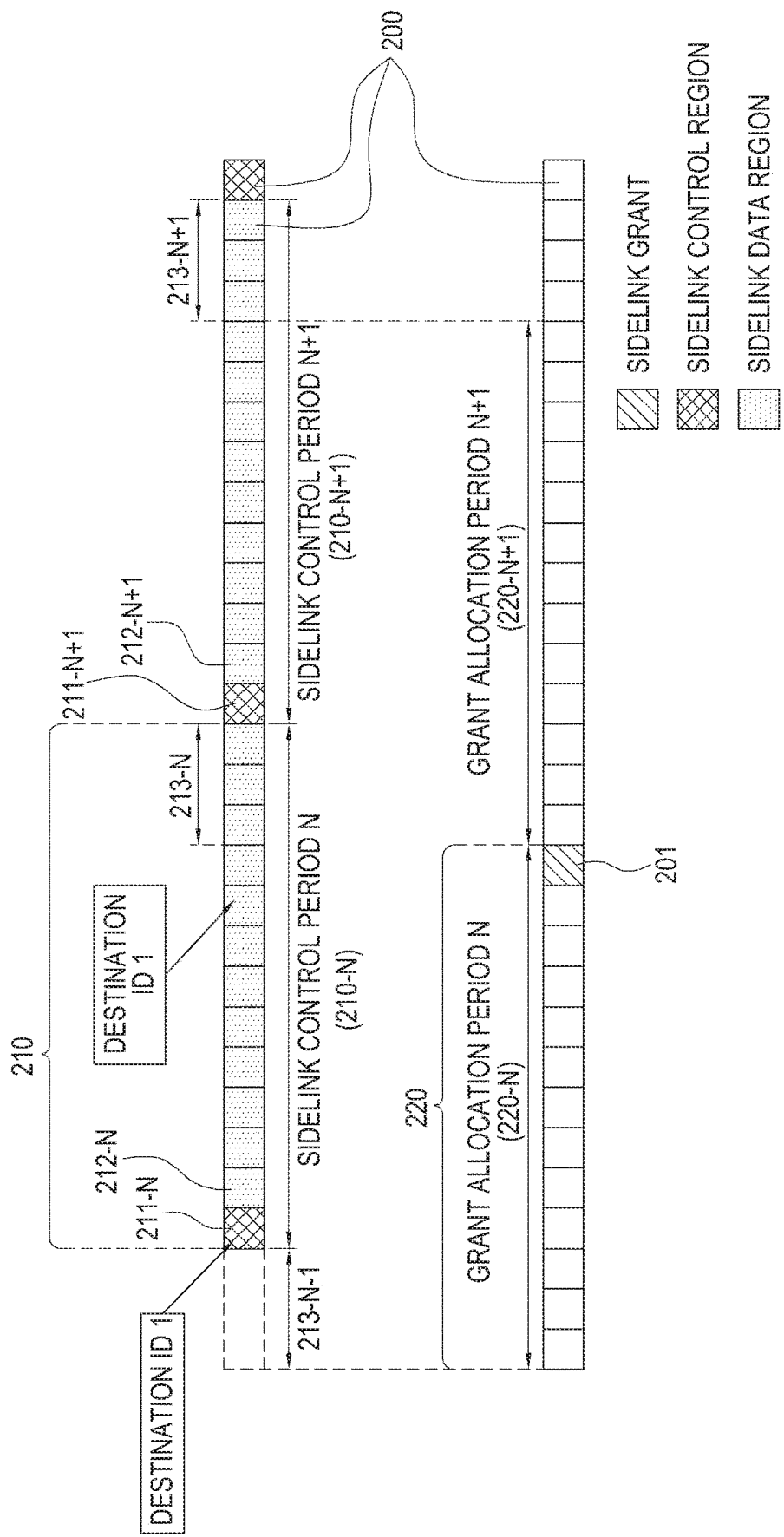
FIG. 2 is a view illustrating an example of a grant received by a user equipment (UE) for a sidelink control (SC) period according to an embodiment of the present disclosure.

FIG. 2 is a view illustrating an example of a grant received by a UE for a sidelink control (SC) period according to an embodiment of the present disclosure.

Referring to FIG. 2, a UE 10 may perform sidelink communication on specified subframes during duration of an SC period 210. SC data and sidelink data may be transmitted using subframes 200 of the SC period 210. The SC period 210 may be the period over which resources allocated in a cell for the transmissions of the SC data and sidelink data occur. The SC period 210 may be defined as a period from a time when the SC data is generated to a time when next SC data is generated and may include an SC region 211-N and a sidelink data region 212-N. The SC region 211-N may be configured of one or more SC subframes for transmitting the SC data, and the sidelink data region 212-N may be configured of data subframes for transmitting sidelink data. Taking FIG. 2 as an example, the SC period 210 may be a period from the subframe of the SC region 211-N of the SC period 210-N to a last data subframe (a subframe positioned right before an SC region 211-N+1 of an SC period 210-N+1) of the sidelink data region 212-N. In the SC period 210, the UE 10 may transmit SC data included in the SC region 211-N in an SC subframe and subsequently transmit sidelink data included in the sidelink data region 212-N in a data subframe. The SC period 210 may continuously be followed by other SC periods. For example, as shown in FIG. 2, the SC period 210 may be continuously repeated as the SC period N (210-N) and the SC period (210-N+1). The SC period N+1 (210-N+1) is a period continuously subsequent to the SC period N (210-N). The UE 10 performs sidelink communication during the SC period N (210-N) and the SC period N+1 (210-N+1).

To support the sidelink communication of the LIE 10, the eNB 20 may allocate resources and send a grant to the UE 10. Here, the grant may be valid during a particular SC period. After receiving the grant, the UE 10 may determine an SC period 210 corresponding to the grant. Preferably, the received grant may remain valid for a first SC period starting, at least some (e.g., at least four) subframes after the subframe where the grant is received. Here, such offset is necessary as a processing time for the UE 10 to perform sidelink communication. Hence, the first SC period starting after the offset is rendered valid and available. The UE 10 may perform transmission during the first SC period using the received grant. For example, the UE 10 receiving the grant during the first SC period may perform sidelink communication with a destination UE by sending the SC data and sidelink data. Here, the UE 10 would transmit a scheduling assignment (SA) in resources of scheduling control region and data in resources of sidelink data region marked by the grant to one destination having a destination ID 1 using the received grant.

In the case shown in FIG. 2, the UE 10 receives a single grant 201. The single grant 201 may be transmitted using a particular subframe 200 within a grant allocation period 220. There may be continuous grant allocation periods 220. For example, the SC period 220 may be continuously repeated as a grant allocation period N (220-N) and a grant allocation period N+1 (220-N+1). The grant allocation period N+1 (220-N+1) is a period continuously subsequent to the grant allocation period N (220-N). In the grant allocation period N (220-N), the UE 10 may receive the single grant 201 from the eNB 20 for transmitting SC data and sidelink data during the SC period N (210-N). The grant allocation period N (220-N) may be a period during which grants for the SC period N (210-N) may be received and may be represented as corresponding to the SC period N (210-N). The grant allocation period N+1 (220-N+1) may be a period during which grants for the SC period N+1 (210-N+1) may be received and may be represented as corresponding to the SC period N+1 (210-N+1).

The UE 10 may perform sidelink communication using the single grant 201 received in a particular subframe in the grant allocation period N (220-N). Here, the grant allocation period N (220-N) may be offset from the SC period N (210-N) for transmission in the SC period N (210-N). The offset subframe 213-N−1 for the offset interval may be at least four subframes (e.g., 4 ms). Thus, the grant allocation period N (220-N) may begin at least four subframes earlier than the SC period N (210-N). The duration of each grant allocation period 220 may be the same as that of the SC period 210. If the grant allocation period 220 and the SC period 210 has the same duration, and the SC period N (210-N) starts delayed by the offset subframe 213-N−1, the UE 10 may transmit SC data and sidelink data during the same SC period N+1 (210-N+1) as the grant allocation period N (220-N), from a subframe after the time when the grant allocation period N (220-N) plus the offset subframe (213-N). Here, the UE 10 may be permitted to do sidelink communication by the grant received during the grant allocation period N (220-N). The offset subframes 213-N−1, 213-N, and 213-N+1 are not limited to four in number, and more or less offset subframes may be included.

Figure 3:
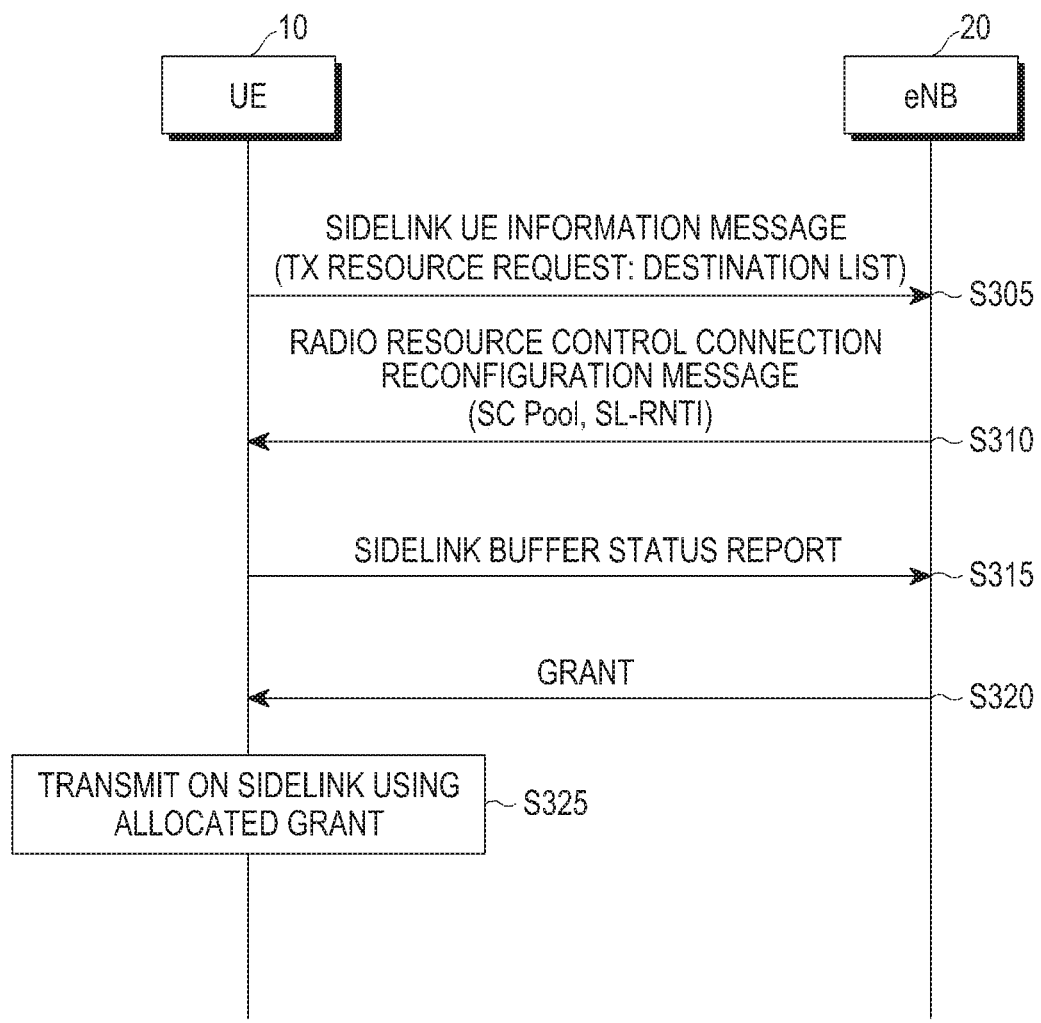
FIG. 3 is a view illustrating an example of performing sidelink communication using a grant according to an embodiment of the present disclosure.

FIG. 3 is a view illustrating an example of performing sidelink communication using a grant according to an embodiment of the present disclosure.

Referring to FIG. 3, to transmit packets, the transmitting-side UE 10 requires resources (e.g., time and frequency) for transmitting SC data and sidelink data. To obtain resources, the UE 10 interested in sidelink communication may transmit a destinationInfoList, i.e., a sidelink UE information (SidelinkUEInformation) message including a list of destinations, to a base station, i.e., the eNB 20 at operation S305.

The eNB 20 may allocate a sidelink resource pool (SC pool) and sidelink radio network temporary identity (SL-RNTI) for transmitting SC data through a radio resource control (RRC) connection reconfiguration message at operation S310. The SC pool represents time and frequency resources by which SC (scheduling) data may be transmitted, i.e., at least one or more subframes and the respective physical resource blocks of the subframes. The time and frequency may periodically be allocated by the SC period 210.

Thereafter, the UE 10 may request dedicated resources for transmission of SC data and sidelink data by transmitting a sidelink buffer status report (BSR) at operation S315.

The eNB 20 may allocate dedicated resources and send a grant 201 for sidelink communication, i.e., information about the dedicated resources at operation S320. The received single grant 201 may be one for an SC period first available as starting predetermined subframes after the subframe of the end point of the grant allocation period N (220-N) during which the single grant 201 has been received. The LTE 10 may perform transmission during the first available SC period 210 using the single grant 201 at operation S325.

Figure 4:
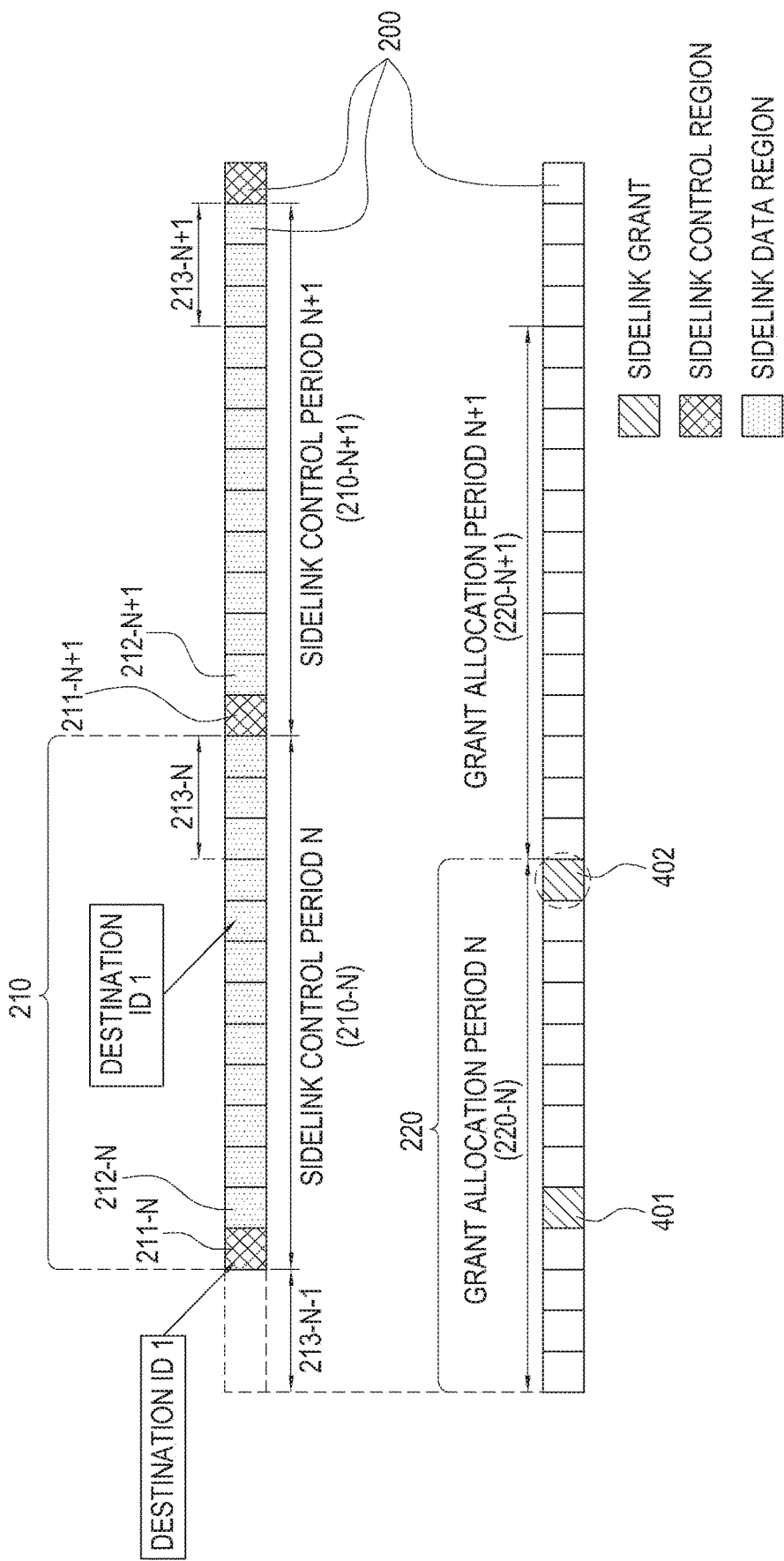
FIG. 4 is a view illustrating an example of processing multiple grants received by a UE for a SC period according to an embodiment of the present disclosure.

FIG. 4 is a view illustrating an example of processing multiple grants received by a UE for an SC period according to an embodiment of the present disclosure.

When the LTE 10 receives multiple grants corresponding to the SC period 210, the UE 10 may use one of the grants, but not the rest. For example, the UE 10 may use the grant received latest but not its previous grants.

Referring to FIG. 4, the UE 10 may receive multiple grants, e.g., a first grant 401 and a second grant 402 and may use the second grant 402 which has been received latest while not using the first grant 401.

Based on the received sidelink grant, the UE 10 may send MAC PDUs to one destination having destination ID 1. The reason is that SC data may represent only one destination ID. In order to transmit MAC PDUs corresponding to the same source ID and destination ID, the UE 10 may use only grant received latest corresponding to the SC period. The source ID and destination ID may be included in the MAC headers of the MAC PDUs. A UE playing a role as a relay (hereinafter, "relaying UE") may have other source IDs for other packet data network (PDN) connections. The relaying UE may relay packets from other remote UEs to other PDN connections or from other PDN connections to other remote UEs and may communicate with remote UEs using other source IDs. Hence, the relaying UE may have a more need for a scheme for processing multiple grants.

Figure 5:
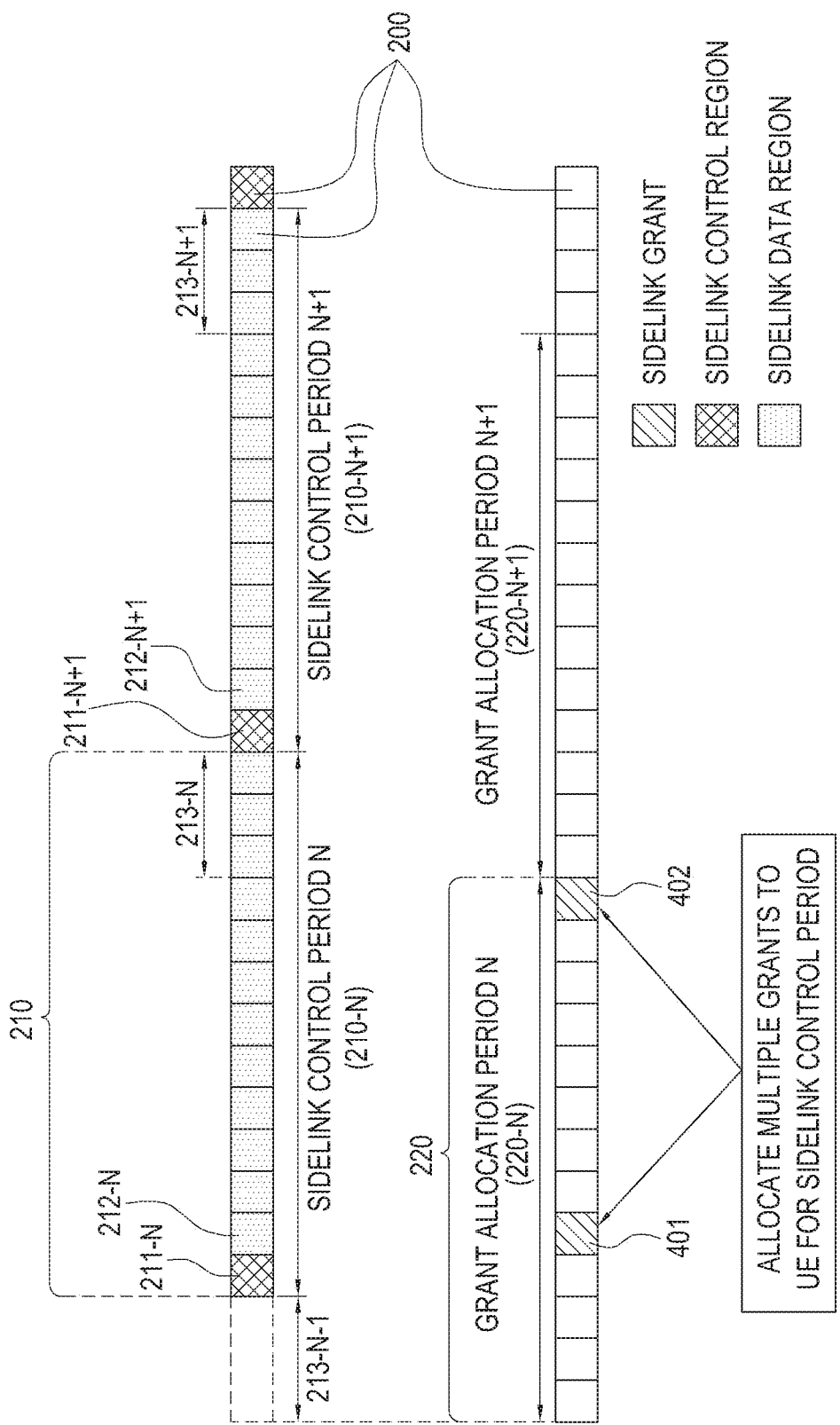
FIG. 5 is a view illustrating an example of multiple grants received by a UE for a SC period according to an embodiment of the present disclosure.

FIG. 5 is a view illustrating an example of multiple grants received by a UE for an SC period according to an embodiment of the present disclosure.

Referring to FIG. 5, all grants received for the SC period 210 are valid grants. The UE 10 may use all of the grants received for the SC period 210 for transmission during the SC period 210. The UE 10, absent a sufficient amount of data to be transmitted, may use only some of the multiple grants allocated.

In the case shown in FIG. 5, two grants 401 and 402 may be received. The multiple grants 401 and 402 may be transmitted using any one subframe 200 in the grant allocation period 220. In the grant allocation period N (220-N), the UE 10 may receive the multiple grants 401 and 402 from the eNB 20 for transmitting SC data and sidelink data during the SC period N (210-N).

The multiple grants 401 and 402 may allow for transmission of SC data and sidelink data in the SC period N (210-N). Preferably, the first grant 401 is one for a SC period first available starting at least some pre-defined subframes after the subframe where the first grant 401 has been received. Here, the SC period first available may occur after the grant allocation period N (220-N), Preferably, the second grant 402 may be one for a SC period first available starting at least a predetermined number of subframes after the subframe where the second grant 402 has been received. Here, the SC period first available may also occur after the grant allocation period N (220-N) and may be the same as an SC period corresponding to the first grant 401. The first grant 401 and the second grant 402 both correspond to the SC period N (210-N), and thus, the UE 10 may determine that the first grant 401 and the second grant 402 are valid during the SC period N (210-N). The UE 10 may use the first grant 401 and the second grant 402 for sidelink transmission during the SC period N (210-N).

Preferably, the first grant 401 and the second grant 402 may be received during the grant allocation period N (220-N). The multiple grants 401 and 402 received in the grant allocation period N (220-N) may correspond to the SC period N (210-N). The UE 10 may perform sidelink communication using the multiple grants 401 and 402 of the grant allocation period N (220-N). Here, the grant allocation period N (220-N) may be offset from the SC period N (210-N) for transmission in the SC period N (210-N). The offset subframe 213-N−1 for the offset interval may be at least four subframes (e.g., 4 ms). Thus, the grant allocation period N (220-N) may begin at least four subframes earlier than the SC period N (210-N). The duration of each grant allocation period 220 may be the same as that of the SC period 210. If the grant allocation period 220 and the SC period 210 has the same duration, and the SC period N (210-N) starts delayed by the offset subframe 213-N−1, the UE 10 may transmit SC data and sidelink data during the same SC period N+1 (210-N+1) as the grant allocation period N (220-N), from a subframe after the time when the grant allocation period N (220-N) plus the offset subframe (213-N). The UE 10 may be permitted to do sidelink communication by the grant received during the grant allocation period N (220-N). The offset subframes 213-N−1, 213-N, and 213-N+1 are not limited to four in number, and more or less offset subframes may be included. Here, the UE 10 may perform single/multiple transmissions to a plurality of destinations having a plurality of destination IDs or multiple transmissions to a single destination having one destination ID by the first grant 401 and the second grant 402.

According to an embodiment of the present disclosure, when multiple grants are received by the UE 10 for an SC period, the UE 10 may use only some of the grants. Not all of the received grants are multiple valid grants. The UE 10 may determine whether the multiple grants are valid and may perform multiple transmissions corresponding to the multiple valid grants. In the embodiment, the UE 10 may determine that amongst the multiple sidelink (SL) grants received in same subframe number of distinct radio frames the SL grant received in latest radio frame is a valid grant. In the embodiment, the UE 10 also may determine that amongst the multiple SL grants received in a radio frame, the SL grant which is received in latest subframe is a valid grant.

Figure 6A:
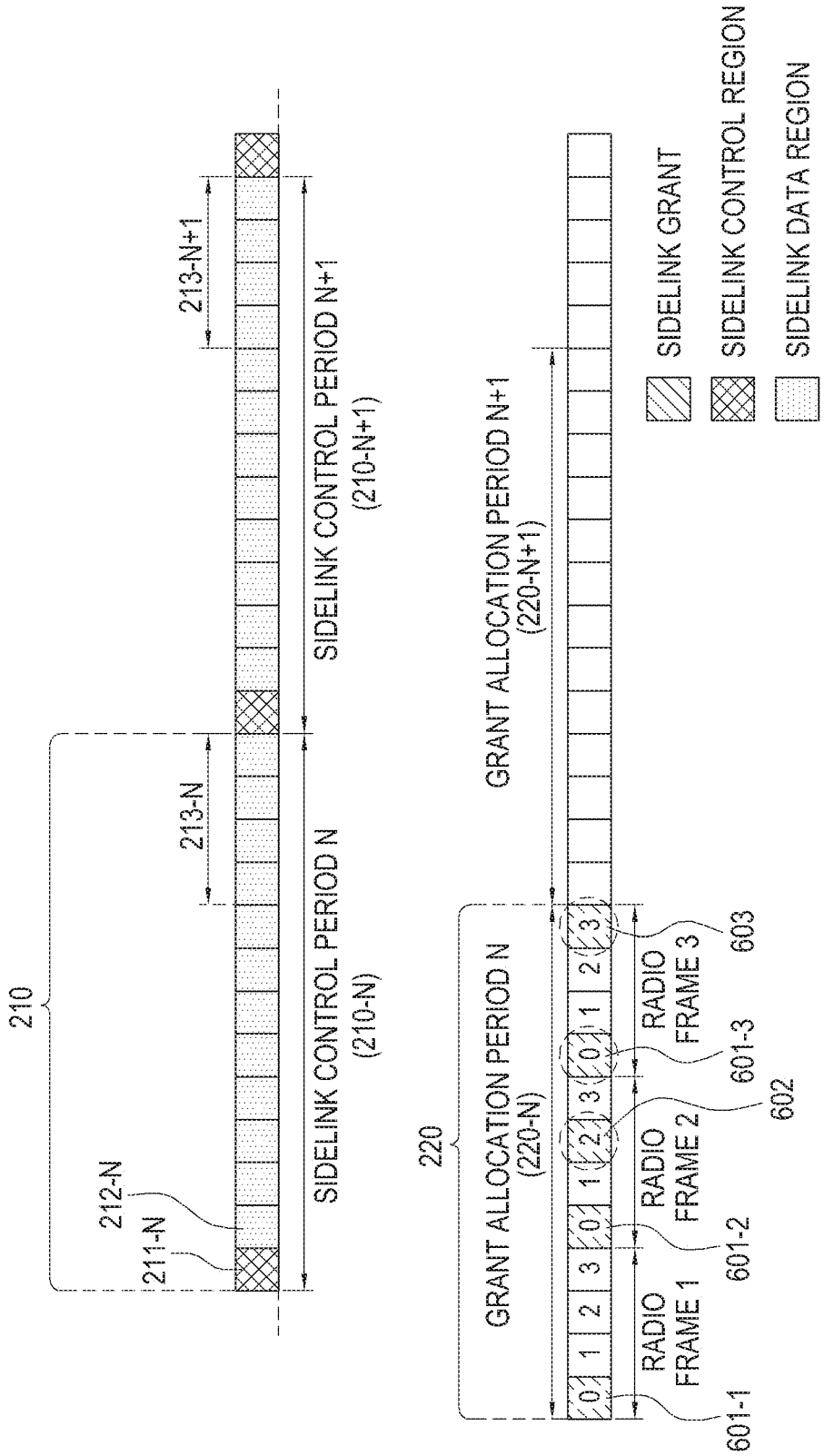
FIGS. 6A and 6B are views illustrating multiple grants received in different radio frames including subframes according to various embodiments of the present disclosure.
Figure 6B:
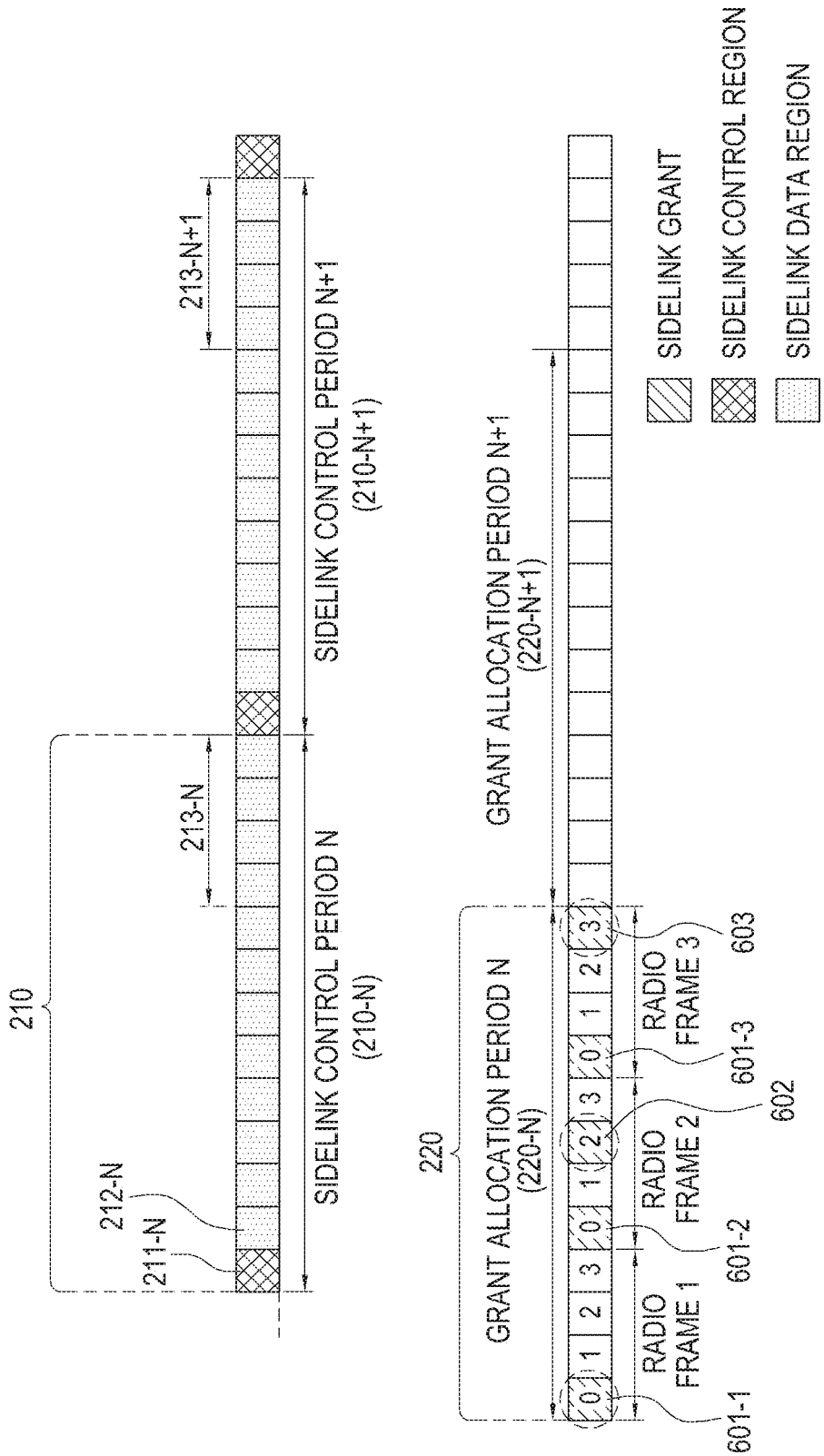

FIGS. 6A and 6B are views illustrating multiple grants received in different radio frames including subframes according to various embodiments of the present disclosure.

The UE 10 may determine that amongst the multiple SL grants received in same subframe number of distinct radio frames, the SL grant received in latest radio frame is a valid grant.

Referring to FIG. 6A, the UE 10 may select some of the five grants received in five different subframes for the SC period N (210-N) or SC period N+1 (210-N+1). It may be assumed that the multiple grants include a grant 1-1 (601-1), a grant 1-2 (601-2), a grant 1-3 (601-3), a grant 2 (602), and a grant 3 (603), and the plurality of radio frames include a radio frame 1, a radio frame 2, and a radio frame 3. According to an embodiment of the present disclosure, the grant 1-1 (601-1) may be received in subframe 0 of the radio frame 1, the grant 1-2 (601-2) in subframe 0 of the radio frame 2, the grant 2 (602) in subframe 2 of the radio frame 2, the grant 1-3 (601-3) in subframe 0 of the radio frame 3, and the grant 3 (603) in subframe 3 of the radio frame 3. Here, the radio frame 2 may come after the radio frame 1, and the radio frame 3 after the radio frame 2. Subframes 0 to 3, which are smaller units than a radio frame, are not limited for absolute timings by logical symbols. The grant 1-1 to the grant 1-3 (601-1, 601-2, and 601-3), respectively, may be received in subframe 0 of the radio frame 1, subframe 0 of the radio frame 2, and subframe 0 of the radio frame 3. The UE 10 may prioritize the grant included in the latest radio frame, determining that, among the grants 1-1 to 1-3 (601-1, 601-2, and 601-3) received in different radio frames but the same subframe, the grant 1-3 (601-3), which is circulated, is valid while excluding the grant 1-1 and the grant 1-2 (601-1 and 601-2) from use. Since the grant 2 and the grant 3 (603) are received in distinct subframes in the radio frame 2 and radio frame 3, respectively, they may immediately be selected without determination as to whether they are valid. Thus, the UE 10 may select and use the grants 1-3, 2, and 3 (601-3, 602, and 603) and perform transmissions corresponding thereto. The eNB 20 may send the same grants in the same subframes of different radio frames. Thus, the UE 10, if missing reception of multiple grants belonging to any one radio frame, may receive multiple grants belonging to the same subframes of other different radio frames. The eNB 20 may use this method to overwrite the grants with new grants.

According to an embodiment of the present disclosure, the eNB 20 may present flexibility by which it allocates multiple grants for SC period and repeat and overwrite grants for reliability. Here, the maximum number of available grants which are allocated to the UE 10 and are valid may be the same as the number of subframes of a radio frame. When the subframes of one radio frame are numbered 0 to 9, the number of the subframes or the maximum number of available grants would be 10.

According to an embodiment of the present disclosure, the UE 10 may determine that amongst the multiple SL grants received in a radio frame, the SL grant which is received in latest subframe is a valid grant.

Referring to FIG. 6B, under the condition shown in FIG. 6A, the UE 10 receives only one grant 601-1 in radio frame 1 and considers it as a valid grant. The UE 10 receives two grants 601-2 and 602 in radio frame 2, and considers the latest i.e. grant 602 among these two grants as a valid grant. The UE 10 receives two grants 601-3 and 603 in radio frame 3, and considers the latest i.e. grant 603 among these two grants as a valid grant. Thus, the LT 10 may select and use the grants 1-1, 2, and 3 (601-1, 602, and 603) and perform transmissions corresponding thereto.

Figure 7:
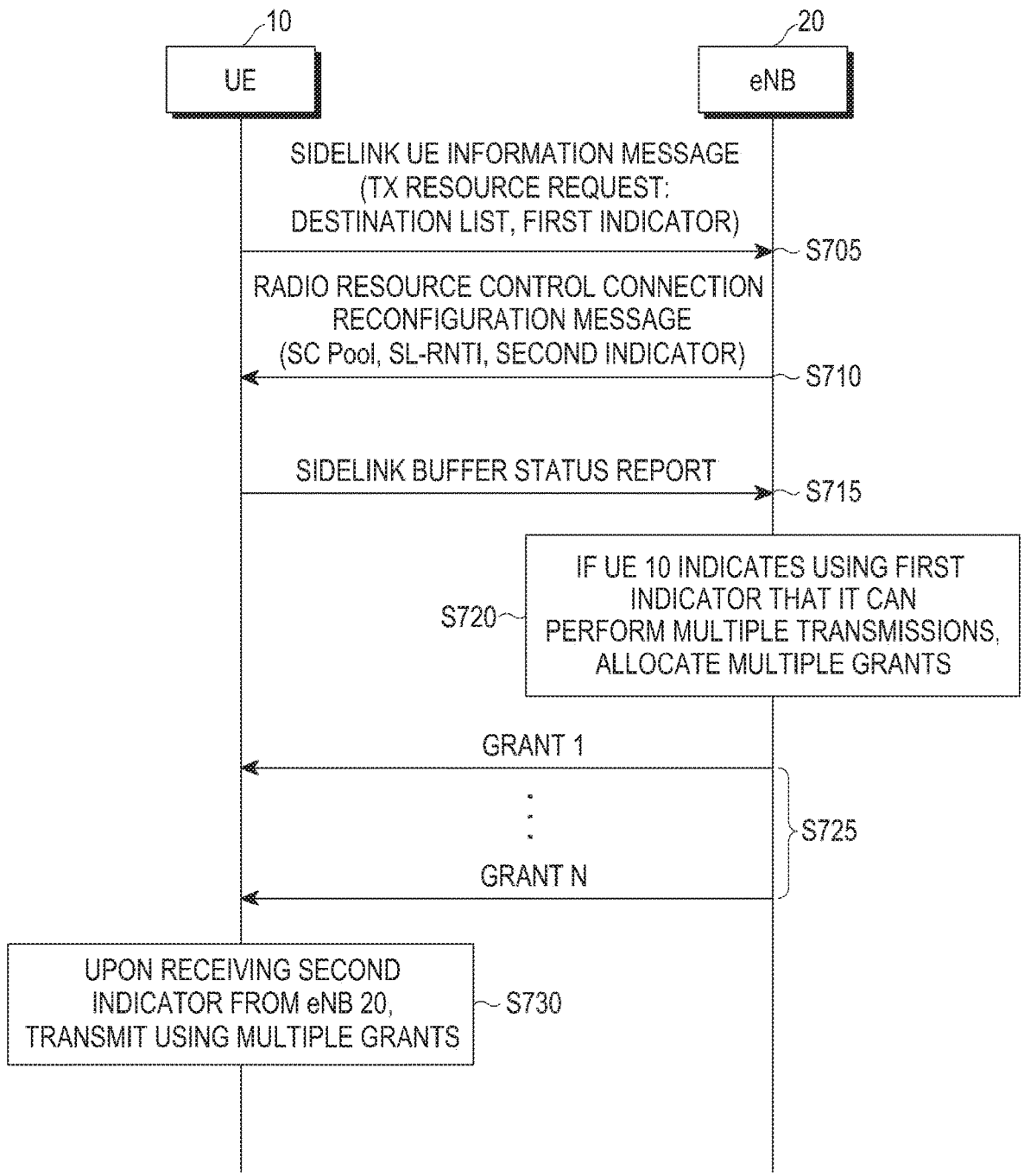
FIG. 7 is a view illustrating an example of processing multiple grants in sidelink communication using a first indicator and a second indicator according to an embodiment of the present disclosure.

FIG. 7 is a view illustrating an example of processing multiple grants in sidelink communication using a first indicator and a second indicator according to an embodiment of the present disclosure.

In the legacy system, when the UE 10 receives multiple grants and each grant received corresponds to any particular SC period 210, the UE 10 may perform transmission using the latest grant. In other words, the UE 10 may replace or disregard the previous grant for a certain SC period 210. Similarly, from an eNB 20 standpoint, whenever the eNB 20 sends new grants, the eNB 20 may release previous grants. A relevant issue is represented in Table 1 below:

TABLE 1

| UE | eNB | Issue |
|---|---|---|
| Legacy UE | Enhanced eNB | ☞ eNB may send multiple grants for transmission to the same destination or multiple destinations in SC period 210. UE may replace or discard previous grants for the same SC period using the latest grant.<br>☞ Results, waste of resources |
| Enhanced UE | Legacy eNB | ☞ eNB may replace previous grants for any particular SC period 210 by sending revised grants. UE may use multiple grants for transmission to multiple destinations or same destination.<br>☞ Results, interference with wide area |

TABLE 1-continued

| UE | eNB | Issue |
|---|---|---|
| | | network (WAN) or other UE's sidelink transmission. |

The legacy UE may perform sidelink communication in the cell of the enhanced eNB (the eNB supporting the above-features of allocating resources to the legacy UE for any particular SC period 210 and transmitting multiple grants). In such case, the eNB sends multiple grants for transmission to a plurality of destinations in the SC period 210. However, the legacy UE uses the latest grant and cannot replace (or overwrite) previous grants for the SC period 210. This may result in waste resources, causing some grants, although allocated, not to be used by the UE.

Likewise, the enhanced LIE may perform sidelink communication in the cell of the legacy eNB. The legacy eNB may be transmitting multiple grants to revise previous grants. In such case, the legacy eNB may send multiple grants revising the previous grants. However, the UE uses both the previous grants and revised grants. This allows the UE to perform transmission with resources not allocated, causing interference with other transmissions.

The above issues may be addressed by introducing a first indicator and second indicator as described below.

The first indicator (indication 1) may indicate that the UE 10 may perform multiple transmissions using multiple grants corresponding to the SC period 210 through a UE capability message or sidelink UE information (SidelinkUE-Information) message or whether the UE 10 supports transmission to a plurality of destinations using multiple grants in the SC period 210. The first indicator may represent information about multiple transmissions by the UE 10. Specifically, the UE 10 may indicate the number of multiple transmissions that may be performed and may indicate the number of hybrid automatic repeat and request (HARQ) processes supported for multiple transmissions. Here, the term "transmission" means transmission of an SA and transmission of one or more MAC PDUs in the SC period. The first indicator may be transmitted by the UE 10 to the eNB 20. The first indicator may be included and transmitted in the sidelink UE information message, or instead in the UE capability message. The UE capability message containing the first indicator may be sent before or after transmitting the sidelink UE information message is transmitted and may not necessarily be accompanied with transmission of the sidelink UE information message.

The second indicator (indication 2) may be a UE capability message, radio resource control connection reconfiguration (RRCConnectionReconfiguration) message or broadcast signaling for mode 1 (non-contention-based resource al location mode) resource allocation and allows the eNB 20 to indicate whether multiple grants for the SC period 210 transmitted by the eNB 20 are ones for multiple transmissions. In other words, the eNB 20 may indicate that the UE 10 performs transmissions to a plurality of destinations during the SC period 210 using multiple grants allocated through an RRCConnectionReconfiguration message for mode 1 resource allocation. Here, mode 1 means an environment where the eNB 20 itself may set up a resource pool necessary for sidelink communication in the coverage. The second indicator may represent information about multiple transmissions by the UE 10. Specifically, the eNB 20 may include the UE 10 where multiple transmissions are performed, whether to permit the multiple transmissions by the UE 10, and/or characteristics of multiple transmissions performed by the UE 10 in the second indicator and instruct the UE 10 to perform multiple transmissions. The eNB 20 may send multiple grants for UEs indicating to support transmission to a plurality of destinations or the UE 10 capable of perform multiple transmissions using multiple grants corresponding to the SC period 210.

Operations of the UE 10 based on the first indicator and second indicator are shown in the following Table 2:

TABLE 2

| First indicator | Second indicator | Operation of UE 10 when multiple grants are received in SC period 210 |
|---|---|---|
| Yes | No | UE 10 uses latest grant and replaces previous grant during any particular SC period 210 |
| No | No | UE 10 uses latest grant and replaces previous grant during any particular SC period 210 |
| Yes | Yes | UE 10 uses all grants for transmission to multiple destinations or same destination |
| No | Yes | UE 10 cannot perform sidelink communication |

The first indicator may indicate whether the UE 10 support multiple transmissions of sidelink communication to other destinations during one SC period 210. The first indicator may have a structure as in the following Table 3:

TABLE 3

```
-- ASN1START
UE-evolved universal mobile telecommunications system (UMTS)
terrestrial radio access
(EUTRA)-Capability „=         SEQUENCE {
,
,
SL-Parameters-v1310 „=        SEQUENCE {
    discSysInfoReporting-r13          ENUMERATED
{supported}    OPTIONAL,
    commMultipleTx-r13          ENUMERATED {supported}
    OPTIONAL,   discInterFreqTx-r13       ENUMERATED
{supported}    OPTIONAL,
    discPeriodicSLSS-r13              ENUMERATED
{supported}    OPTIONAL
}
```

The first indicator may be included in the UE-EUTRA-Capability field. Specifically, the first indicator may be specified to indicate whether in the commMultipleTx-r13 field the UE 10 supports multiple transmissions of sidelink communication to different destinations during one SC period 210.

The second indicator may indicate that the UE 10 is to perform multiple transmissions for sidelink communication to different destinations during one SC period 210. The second indicator may have a structure as in the following Table 4:

TABLE 4

```
SL-CommConfig-r12 „=                SEQUENCE  {
[[   commTxResources-v1310                 CHOICE {
       release                            NULL,
       setup                              CHOICE {
         scheduled-v1310                       SEQUENCE {
         logicalChGroupInfoList-r13    ,
           multipleTx-r13                    BOOLEAN
         },
         ue-Selected-v1310                 SEQUENCE {
,
  ]]
```

The second indicator may be included in the SL-CommConfig-r12 field. Specifically, the second indicator may be specified in the multipleTx-r13 field to indicate whether the UE 10 is to perform multiple transmissions to different destinations during one SC period 210. For example, the second indicator in the multipleTx-r13 field may have a TRUE value, which may indicate that multiple transmissions are to be performed.

Referring to FIG. 7, operations for processing multiple grants in an SC period using the first indicator and the second indicator are described below.

The transmitting-side UE 10 requires resources (e.g., time and frequency) for transmitting SC data and sidelink data. To obtain resources, the UE 10 interested in sidelink communication sends the first indicator and sidelink UE information message including a destination list to the eNB 20 at operation S705. The first indicator represents information about multiple transmissions by the UE 10.

The eNB 20 allocates, to the UE 10, an SC pool for transmission of SC data, SL-RNTI, and second indicator, through an RRC connection reconfiguration message at operation S710. Here, the second indicator may be allocated and transmitted to the UE 10, included in a UE capability message or broadcast signaling for mode 1 resource allocation. The operation of transmitting the second indicator may be performed in any operation before sending grant.

The UE 10 may request dedicated resources for SC and sidelink data transmission by sending a sidelink buffer status report at operation S715.

The eNB 20, when the UE 10 indicates that it may perform multiple transmissions using the first indicator, may allocate dedicated resources to the UE 10 for transmission of multiple grants at operation S720.

The eNB 20 sends multiple grants for sidelink communication, i.e., information about the dedicated resources at operation S725, When receiving the second indicator from the eNB 20, the UE 10 may perform single/multiple transmissions using the multiple grants at operation S730.

Figure 8:
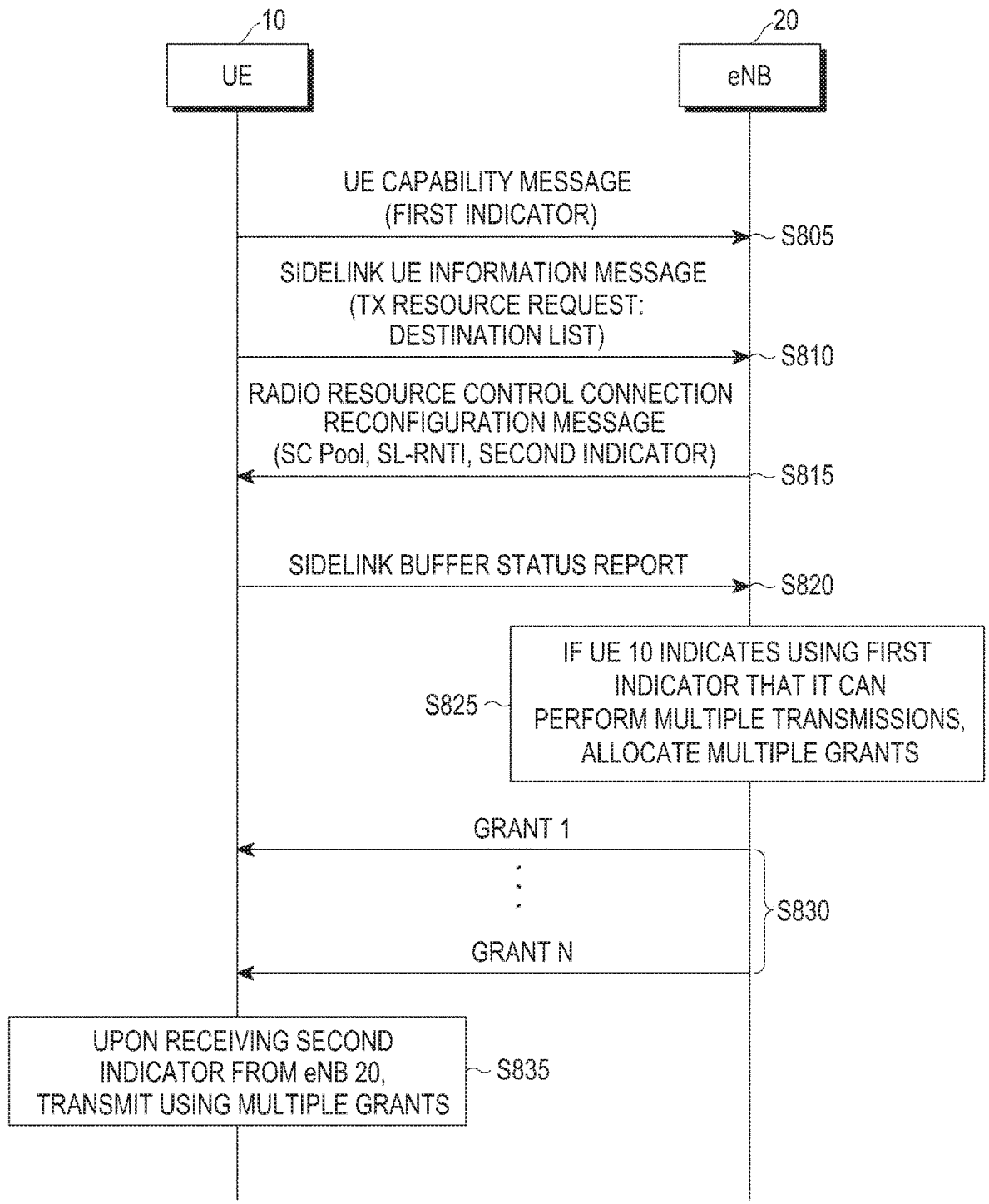
FIG. 8 is a view illustrating an example of processing multiple grants in sidelink communication using a first indicator included in a UE capability message according to an embodiment of the present disclosure.

FIG. 8 is a view illustrating an example of processing multiple grants in sidelink communication using a first indicator included in a UE capability message according to an embodiment of the present disclosure.

FIG. 8 shows operations for processing multiple grants similar to those shown in FIG. 7 except that the first indicator sent from the UE 10 to the eNB 20 is included in the UE capability message.

The UE 10 may send the first indicator to the eNB 20 through a LTE capability message before or after sending a sidelink LTE information message to the eNB 20 in order to obtain resources for transmitting SC data and sidelink data at operation S805.

The UE 10 may send a sidelink UE information message including a destination list to the eNB 20 at operation S810.

The eNB 20 may allocate, to the UE 10, the second indicator, sidelink RNTI, and SC pool for transmitting SC data through a RRC connection reconfiguration message at operation S815. Here, the second indicator may be allocated and transmitted to the UE 10, included in a UE capability message or broadcast signaling for mode 1 resource allocation. The operation of transmitting the second indicator may be performed in any operation before sending grant.

The UE 10 may request dedicated resources for SC and sidelink data transmission by sending a sidelink buffer status report at operation S820.

The eNB 20, when the UE 10 indicates that it may perform multiple transmissions using the first indicator, may allocate dedicated resources to the UE 10 for transmission of multiple grants at operation S825.

The eNB 20 may send multiple grants for sidelink communication, i.e., information about the dedicated resources at operation S830. When receiving the second indicator from the eNB 20, the UE 10 may perform single/multiple transmissions using the multiple grants at operation S835.

Figure 9:
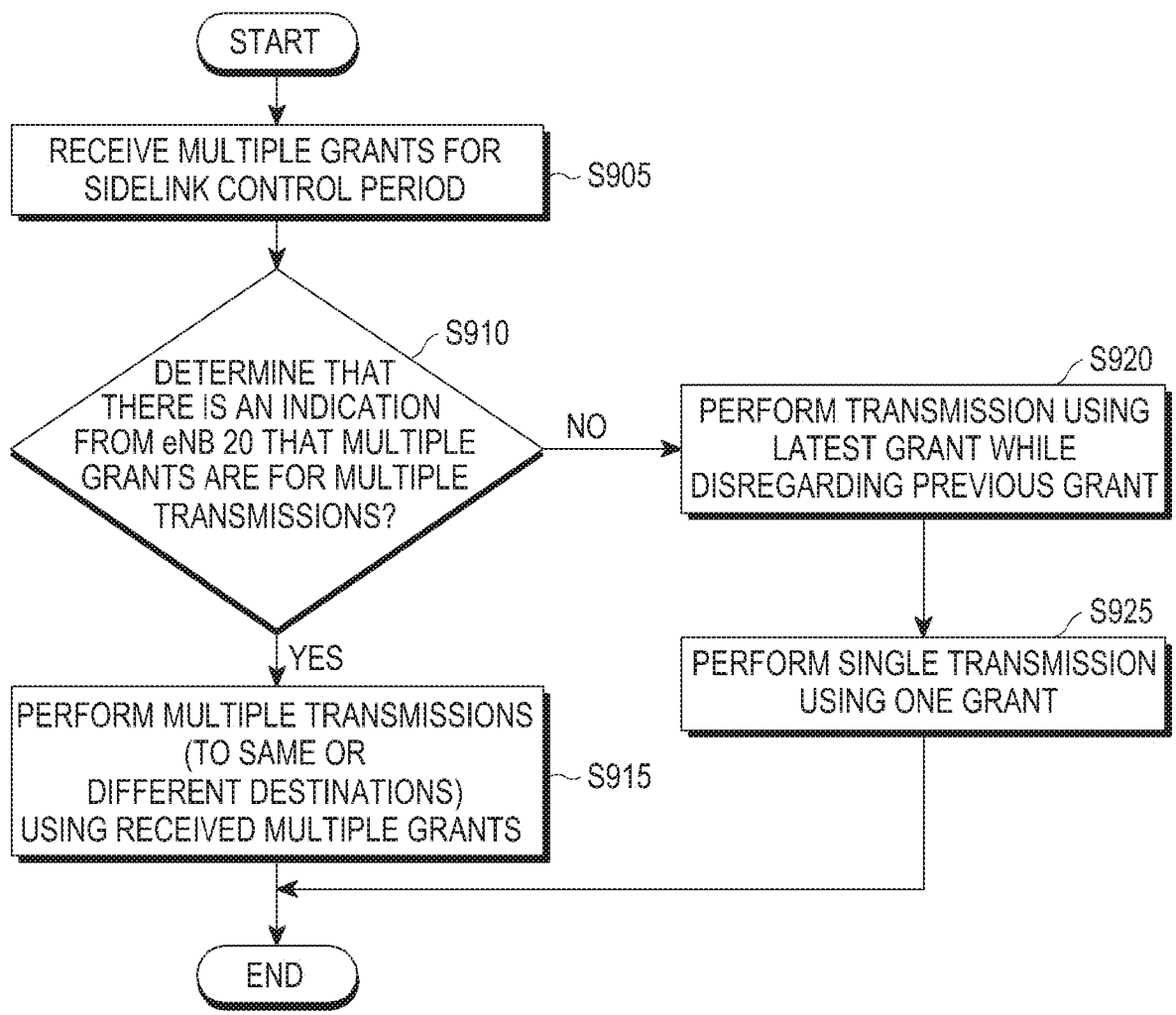
FIG. 9 is a view illustrating an example of receiving and processing multiple grants by a UE according to an embodiment of the present disclosure.

FIG. 9 is a view illustrating an example of receiving and processing multiple grants by a UE 10 according to an embodiment of the present disclosure.

FIG. 9 illustrates operations of the UE 10 supporting multiple transmissions for the same destination in the SC period 210 or transmission to a plurality of destinations when the UE 10 receives multiple grants.

The UE 10 may receive multiple grants for the SC period 210 from the eNB 20 at operation S905.

The UE 10 may determine whether there is an indication as to whether the multiple grants from the eNB 20 are ones for multiple transmissions at operation S910. The UE 10, when allocated with sidelink resources through a RRC connection reconfiguration message from the eNB 20, may also receive the second indicator included in the RRC connection reconfiguration message. The UE 10 may receive from the eNB 20 the second indicator included in broadcast signaling for mode 1 resource allocation or a UE capability message through a separate operation. The UE 10 may determine whether the second indicator has been received which indicates whether transmission is performed to one destination or a plurality of different destinations during the SC period 210 using multiple grants received by the UE 10 from the eNB 20 at operation S910.

Upon receiving the second indicator, the UE 10 may perform single/multiple transmissions to the same or different destinations using the multiple grants received at operation S915.

When the UE 10 fails to receive the second indicator, the UE 10 may use the latest grant. The latest grant may be one grant, and the UE 10 may replace or disregard the previous grant at operation S920. The UE 10 may perform single transmission using one grant. Since the UE 10 accommodates only one grant, only one sidelink transmission may be performed accordingly at operation S925.

Figure 10:
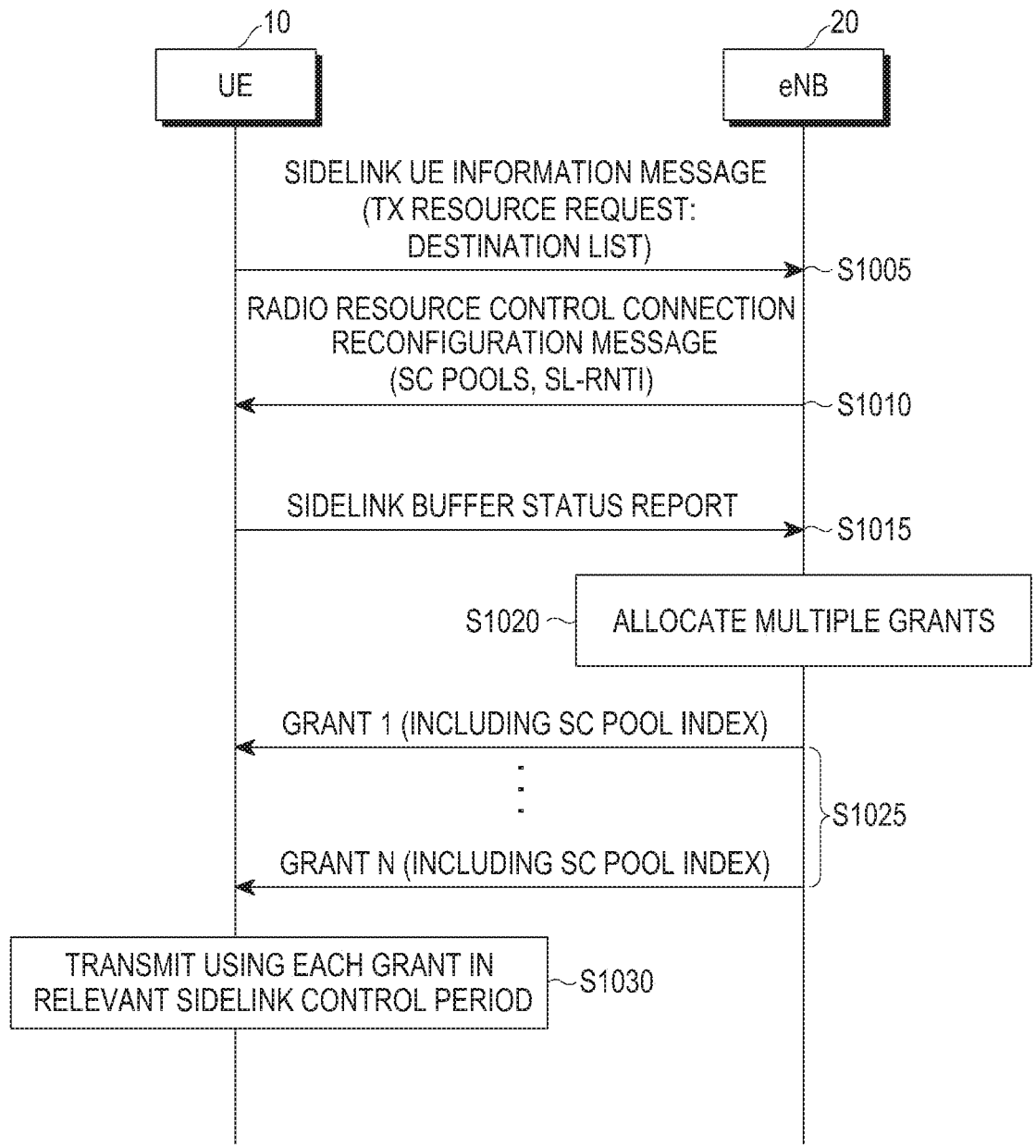
FIG. 10 is a view illustrating an example of processing multiple grants in sidelink communication using multiple sidelink resource pools (SC pools) according to an embodiment of the present disclosure.

FIG. 10 is a view illustrating an example of processing multiple grants in sidelink communication using multiple SC pools according to an embodiment of the present disclosure.

The eNB 20 may allocate resources for different transmissions from different SC pools. In this case, the eNB 20 may configure multiple SC pools in a RRC connection reconfiguration message in response to the sidelink UE information message. The eNB 20 may display sidelink resource full indexes for each grant. The UE 10 may perform multiple transmissions in the SC period in association with the SC pool of the received grant.

Referring to FIG. 10, operations for processing multiple grants including SC pool indexes and associated with multiple SC pools are described as an example.

The UE 10 may send a sidelink UE information message including a destination list to the eNB 20 at operation S1005.

The eNB 20 may allocate SC pools and a sidelink RNTI for transmitting SC data to the UE 10 at operation S1010.

The UE 10 may request dedicated resources for SC and sidelink data transmission by sending a sidelink buffer status report at operation S1015.

For the UE 10, the eNB 20 allocate dedicated resources and multiple grants which are information about the dedicated resources at operation S1020.

The eNB 20 may send multiple grants each including the SC pool index to the UE 10 at operation S1025.

The UE 10 may perform multiple transmissions using each grant in the relevant SC period considering the SC pool index at operation S1030.

Figure 11:
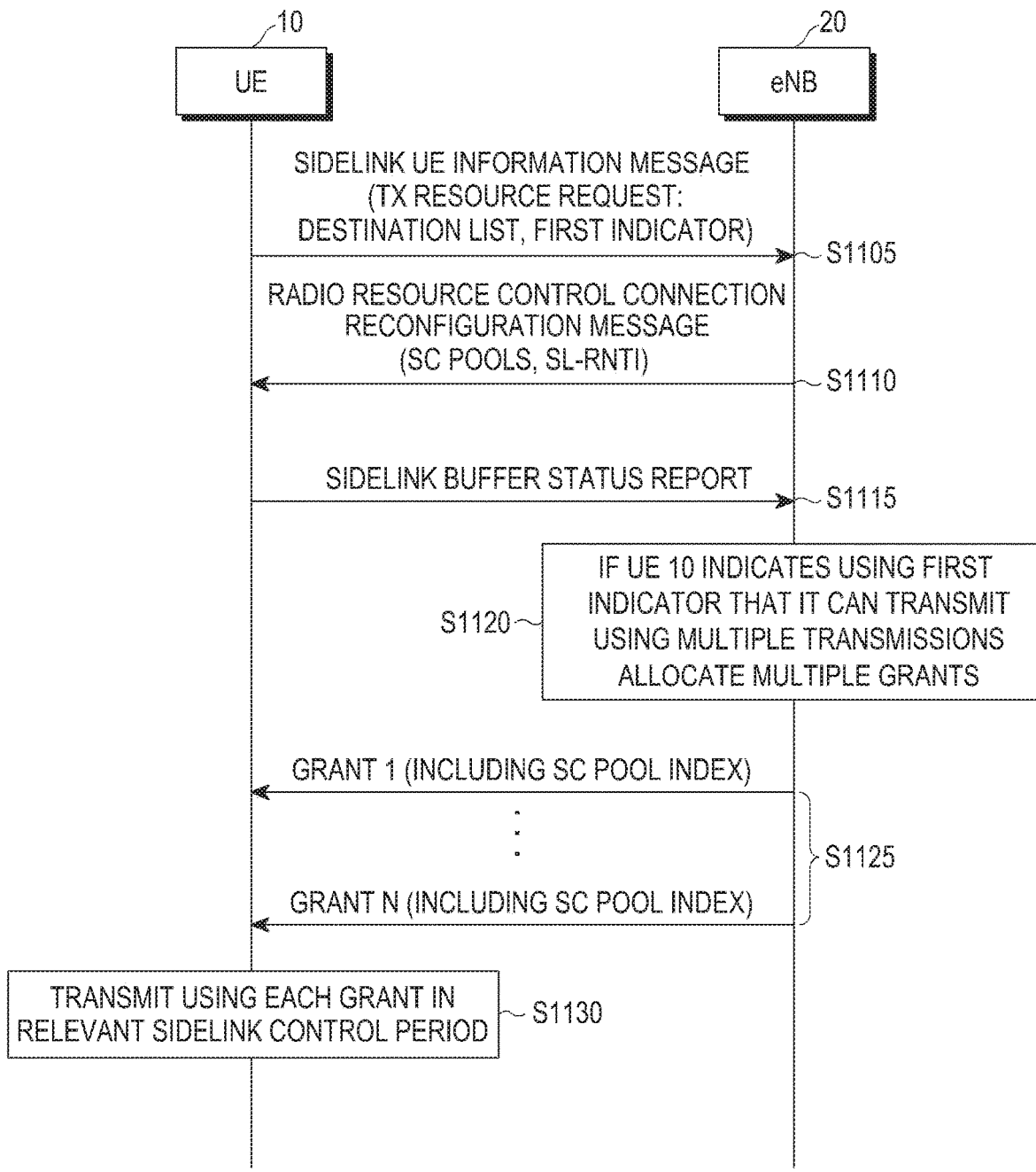
FIG. 11 is a view illustrating an example of processing multiple grants in sidelink communication using a first indicator and multiple SC pools according to an embodiment of the present disclosure.

FIG. 11 is a view illustrating an example of processing multiple grants in sidelink communication using a first indicator and multiple SC pools according to an embodiment of the present disclosure.

Referring to FIG. 11, the UE 10 may perform sidelink communication by sending the first indicator and multiple SC pools to the eNB 20. When processing multiple grants in the sidelink communication using multiple SC pools, the first indicator and the second indicator may also be used. Here, an example of using the first indicator is described.

The UE 10 may send a sidelink UE information message including a destination list to the eNB 20 at operation S1105.

The eNB 20 may allocate SC pools and a sidelink RNTI for transmitting SC data to the UE 10 at operation S1110.

The UE 10 may request dedicated resources for SC and sidelink data transmission by sending a sidelink buffer status report at operation S1115.

When it is indicated that the UE 10 may perform transmission using multiple transmissions using the first indicator, the eNB 20 may allocate dedicated resources and multiple grants that are information about the dedicated resources at operation S1120.

The eNB 20 may send multiple grants each including the SC pool index to the UE 10 at operation S1125.

The UE 10 may perform multiple transmissions using each grant n the relevant SC period at operation S1130.

Figure 12:
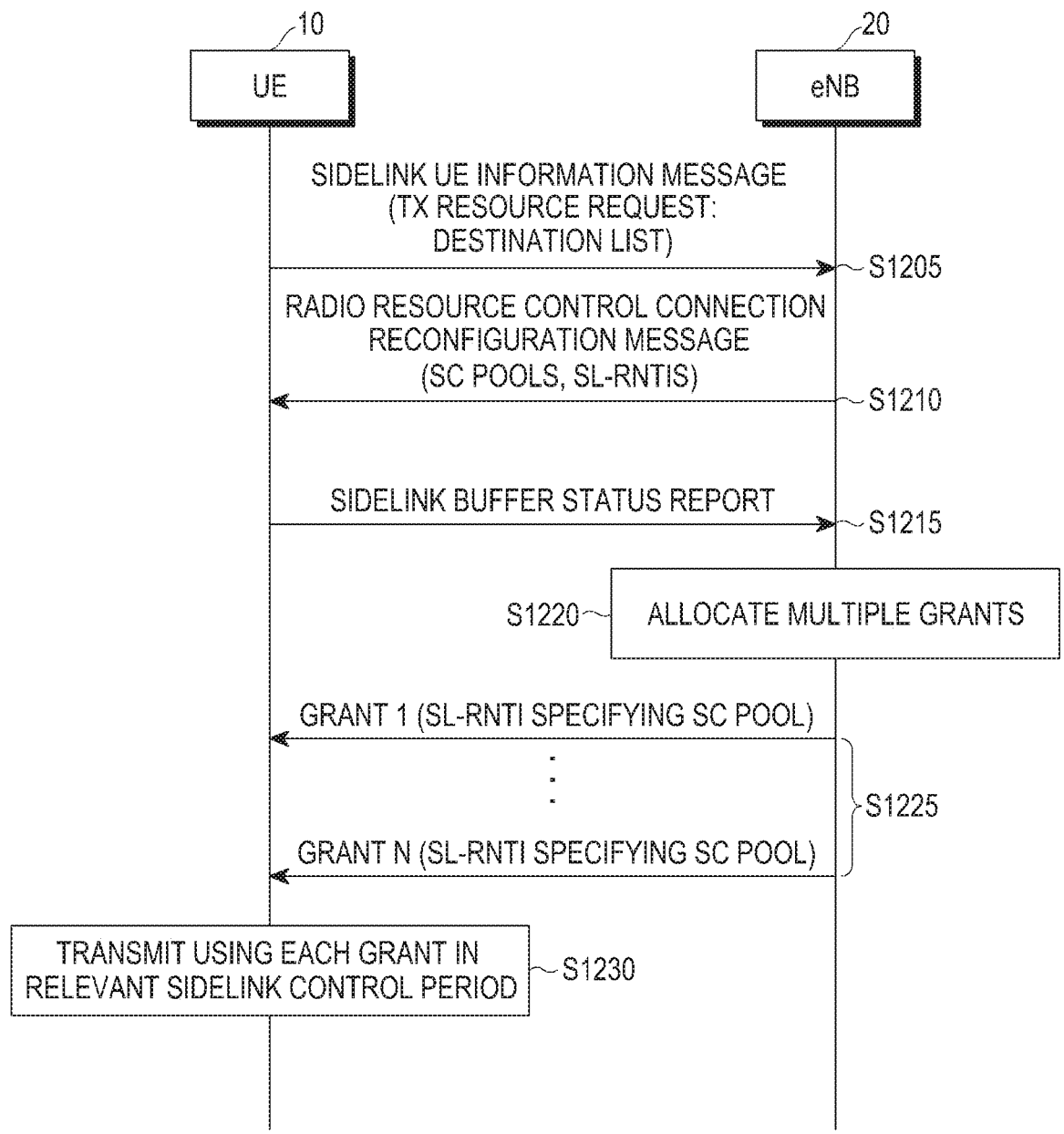
FIG. 12 is a view illustrating an example of processing multiple grants in sidelink communication using multiple SC pools and multiple sidelink radio network temporary identities (RNTIs) according to an embodiment of the present disclosure.

FIG. 12 is a view illustrating an example of processing multiple grants in sidelink communication using multiple SC pools and multiple sidelink RNTIs according to an embodiment of the present disclosure.

The eNB 20 may allocate sidelink RNTIs for each SC pool besides the SC pools when allocating resources for different transmissions from different SC pools. In this case, the grant corresponding to the SC pool may be indicated by masking the cyclic redundancy check (CRC) of physical downlink control channel (PDCCH) to the sidelink RNTI corresponding to the SC pool. The UE 10 may perform multiple transmissions in the SC period associated with the SC pool in the received grant.

Referring to FIG. 12, operations for processing multiple grants including multiple sidelink RNTIs specifying SC pool and associated with multiple SC pools are described as an example.

The UE 10 may send a sidelink UE information message including a destination list to the eNB 20 at operation S1205.

The eNB 20 may allocate SC pools and multiple sidelink RNTIs for transmitting SC data to the UE 10 at operation S1210.

Thereafter, the UE 10 may request dedicated resources for SC and sidelink data transmission by sending a sidelink buffer status report at operation S1215.

The eNB 20 may allocate dedicated resources and multiple grants which are information about the dedicated resources at operation S1220.

The eNB 20 may send multiple grants each including a sidelink RNTI specifying the SC pools to the LIE 10 at operation S1225.

The UE 10 may perform multiple transmissions using each grant in the relevant SC period at operation S1230.

Figure 13:
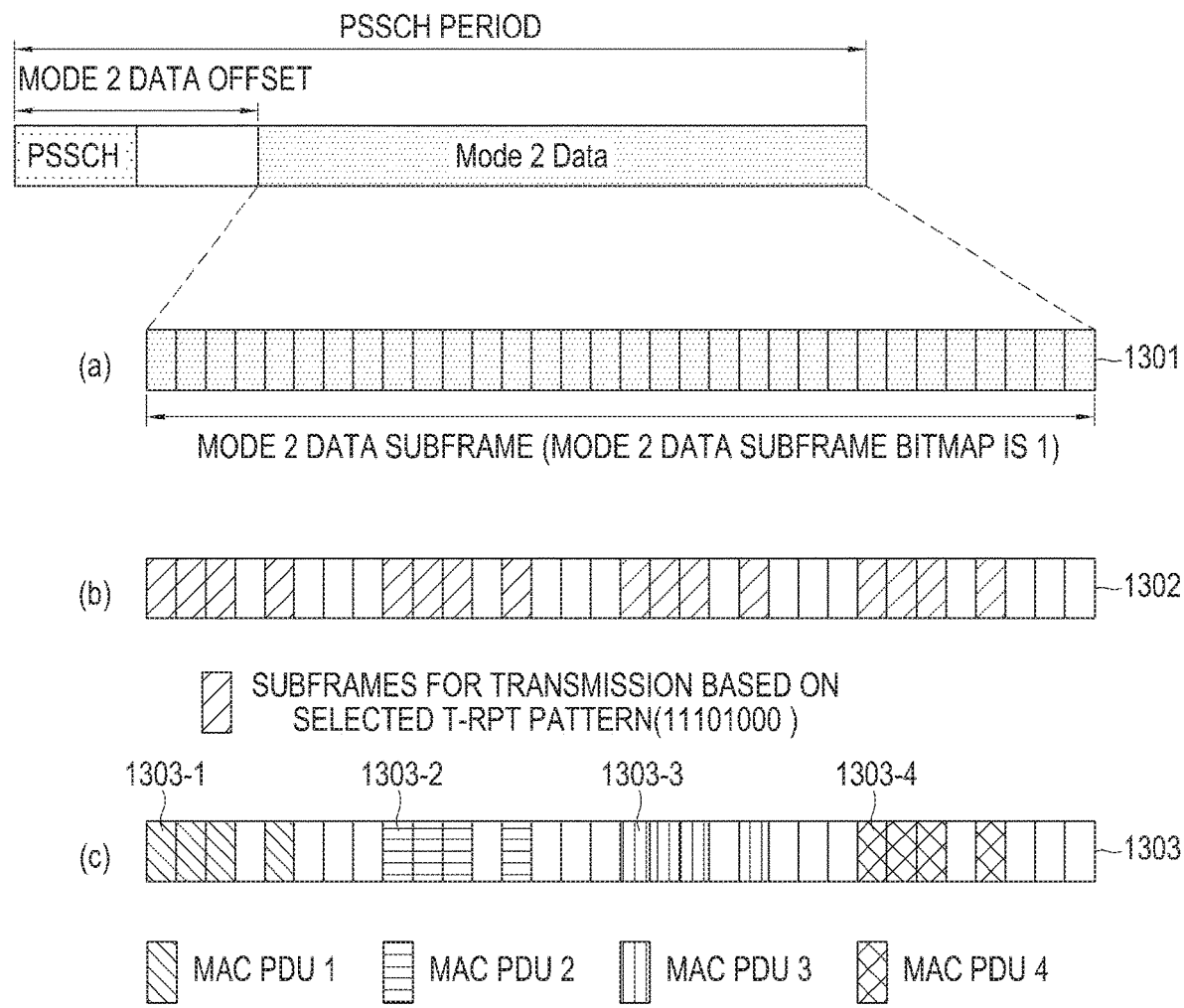
FIG. 13 is a view illustrating an example of transmitting media access control packet data units (MAC PDUs) to multiple destinations by multi-scheduling assignment (multi-SA) transmission or multi-data transmission according to an embodiment of the present disclosure.

FIG. 13 is a view illustrating an example of transmitting MAC PDUs to multiple destinations by multi-SA transmission or multi-data transmission according to an embodiment of the present disclosure.

According to the present disclosure, there is provided a method for handling collisions in multiple transmissions when multiple transmissions are performed after receiving multiple grants. The multiple transmissions may include multiple SA transmissions or multiple data transmissions.

In the multiple SA transmissions, SA resources in the case of mode 2 (contention-based resource allocation mode) may randomly be selected from an SA resource pool. An SA may be transmitted over at least one or more subframes. When the UE 10 selects multiple SA resources randomly from the SA resource pool, one or two subframes for SA transmission to one destination may be the same as one or two subframes for SA transmission to another destination. The term "overlap" may mean using one or more subframes in separate transmissions. The overlap operation may arise even when the SA resources for transmitting SAs to the plurality of destinations are selected from different SA resource pools when the SA resource pools overlap each other.

The UE 10 cannot send multiple SAs in one subframe due to the single carrier frequency division multiple (SC-FDM) limitation. To address such issue, two available methods are present.

First, in case of discovery, the UE 10 may be permitted to select a plurality of discovery resources from a discovery resource pool to send a plurality of discovery messages. Collision may be avoided by excluding discovery resources belonging to the subframes of the discovery resources already selected for transmission. Similarly, this may be applicable to SA transmissions. In other words, the UE 10 may select SA resources from the SA resource pool while excluding any resources belonging to the subframes of the SA resources already selected for SA transmissions.

Second, when the SA transmission for one destination overlaps the SA transmission for another destination, the UE 10 transmits only one SA while stopping (or dropping) the other. The SA transmission dropped may be left as a matter regarding a UE implementation as based on the data priority. Each SA may be transmitted over one subframe and may be repeated in another subframe. According to an embodiment of the present disclosure, when two subframes overlap each other, the SA transmission drops, and when they partially overlap, only the SA transmission in the subframes overlapping each other may be dropped. According to an embodiment of the present disclosure, when one or two subframes overlap, SA transmission may drop.

In multiple data transmissions corresponding to multiple SA transmissions, in case of mode 2, a time-resource pattern of transmission (T-RPT) index may randomly be selected from a set of T-RPTs by the UE 10. For data transmission, the T-RPT index may determine subframes available to the UE 10 in the data resource pool. When the UE 10 selects a plurality of T-RPT indexes randomly from the data resource pool, one or multiple subframes for data transmission to one destination may be the same as one or multiple subframes for data transmission to another destination. The term "overlap" may mean using one or more subframes in separate transmissions. The overlap operation may arise even when the data resources for transmitting data to the plurality of destinations are selected from different data resource pools when the data resource pools overlap each other.

The UE 10 cannot send multiple data PDUs in one subframe due to SC-FDM limitations. To address such issue, two available methods are present.

First, the UE 10 may select a T-RPT index from a T-RPT set while excluding any T-RPT index resulting in the data subframe overlapping the subframes already selected for data transmission.

Second, when the subframe for data transmission to one destination is the same as the data transmission to another destination, the UE 10 may transmit one but drop the other. The dropping data transmission may be left as a matter regarding a HE implementation.

When the UE 10 sends transmissions to several destinations, the first approach above may limit the number of T-RPT indexes available for selection. Further, there may be a plurality of chances depending on the number of data subframes in the data resource pool and T-RPT index, and the UE 10 might not use all of them for a predetermined destination. For example, it is assumed that the UE 10 selects the same T-RPT index corresponding to two different data transmissions or SA transmissions in the SA period. Then, as shown in FIG. 13, the UE 10 selects subframes for transmission based on the T-RPT index from the data subframe 1301 for mode 2. The UE 10 has a chance to transmit four MAC PDUs 1303 using the T-RPT subframes 1302 which are data subframes corresponding to the selected T-RPT index. The UE 10 may send MAC PDU 1 (1303-1) and MAC MU 2 (1303-2) corresponding to destination 1 and MAC PDU 3 (1303-3) and MAC PDU 4 (1303-4) corresponding to destination 2. In this case, the first approach above need not be carried out. In the case of mode 2, once the SC period and its corresponding data all are SC-FDM limited and sent dependently, multiple transmissions may be performed for different destinations in the SC period.

Figure 14:
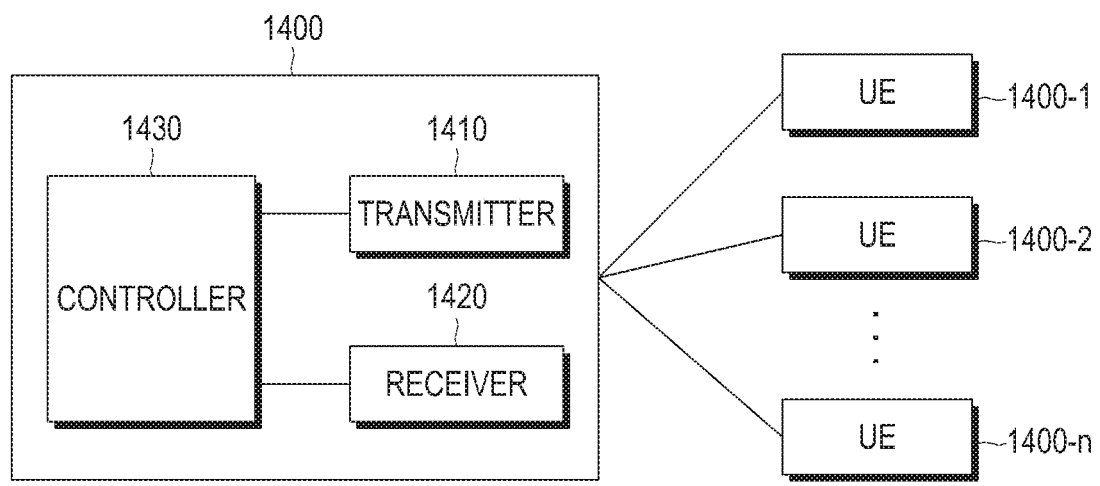
FIG. 14 is a view schematically illustrating a configuration of a UE according to an embodiment of the present disclosure.

FIG. 14 is a view schematically illustrating a configuration of a UE according to an embodiment of the present disclosure.

Figure 15:
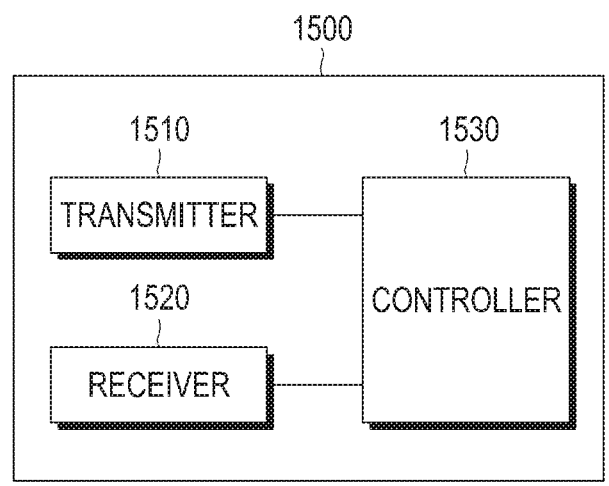
FIG. 15 is a view schematically illustrating a configuration of an evolved node B (eNB) according to an embodiment of the present disclosure.

Referring to FIG. 14, a UE 1400 may perform sidelink communication with neighboring UEs 1400-1, 1400-2, . . . , and 1400-*n* and receive resources and grants for sidelink communication from an eNB 1500 (FIG. 15). The UE 1400 may include a transmitter 1410, a receiver 1420, and a controller 1430.

The transmitter 1410 sends a request for single or multiple grants to the eNB 1500. However, by way of example, and not as a limitation, resources, data, and signals for sidelink communication as described above in detail may be sent to another entity, according to the present disclosure.

The receiver 1420 receives single or multiple grants from the eNB 1500. However, by way of example, and not as a limitation, resources, data, grants, and signals for sidelink communication as described above in detail may be received from another entity, according to the present disclosure.

The controller 1430 may perform multiple transmissions to the same destination or multiple destinations corresponding to the received single or multiple grants. However, by way of example, and not as a limitation, the controller 1430 may make the determination for sidelink communication as described above and may transmit commands as per the determination to the transmitter 1410 and the receiver 1420.

All of the operations of the transmitter 1410 and the receiver 1420 may be appreciated as performed under the control of the controller 1430. The transmitter 1410, the receiver 1420, and the controller 1430 are not necessarily implemented as separate devices, respectively, but may be implemented in a single configuration unit in the form of e.g., a single chip.

FIG. 15 is a view schematically illustrating a configuration of an eNB according to an embodiment of the present disclosure.

Referring to FIG. 15, the eNB 1500 may send resources, grants, and data to the UE 1400 to allow the UE 1400 to perform sidelink communication. The eNB 1500 may include a transmitter 1510, a receiver 1520, and a controller 1530.

The transmitter 1510 may send single or multiple grants to the UE 1400. However, without limited thereby, resources, data, and signals for sidelink communication as described above in detail may be sent to another entity, according to the present disclosure.

The receiver 1520 receives a request for single or multiple grants from the UE 1400. However, by way of example, and not as a limitation, data and signals for sidelink communication as described above in detail may be received from another entity, according to the present disclosure.

The controller 1530 may allocate single or multiple grants to allow the UE 1400 to perform multiple transmissions to the same or multiple destinations corresponding to the single or multiple grants. However, by way of example, and not as a limitation, the controller 1430 may make the determination for sidelink communication as described above and may transmit commands as per the determination to the transmitter 1510 and the receiver 1520.

All of the operations of the transmitter 1510 and the receiver 1520 may be appreciated as performed under the control of the controller 1530. The transmitter 1510, the receiver 1520, and the controller 1530 are not necessarily implemented as separate devices, respectively, but may be implemented in a single configuration unit in the form of e.g., a single chip.

It should be noted that the device configurations or examples of processing grants shown and described in connection with FIGS. 1 to 5, 6A and 6B, and 7 to 15 are not intended to limit the scope of the present disclosure. In other words, all the components or operations illustrated in FIGS. 1 to 5, 6A and 6B, and 7 to 15 should not be construed as essential components to practice the present disclosure, and the present disclosure may be rather implemented with only some of the components without departing from the gist of the present disclosure. An embodiment according to the present disclosure may be applicable to vehicle-to-vehicle (V2V) communication. Devices applicable to the present invention may be vehicles.

The above-described operations may be realized by equipping at least one memory device retaining their corresponding program codes in any component of the UE or eNB. That is, the controller in the eNB or UE may execute the above-described operations by reading and running the program codes stored in the at least one memory device by at least one processor or central processing unit (CPU).

As described herein, various components or modules in the UE or eNB may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or application-specific integrated circuits (ASICs).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a sidelink communication by a terminal, the method comprising:

19 transmitting, to a base station, capability information including first information indicating whether the terminal supports multiple transmissions of the sidelink communication to different destination terminals in a sidelink control (SC) period;

receiving, from the base station, configuration information for the multiple transmissions; and performing the multiple transmissions in the SC period based on the configuration information, wherein the configuration information includes second information indicating whether the multiple transmissions to the different destination terminals are to be performed by the terminal in the SC period.

2. The method of claim 1, wherein the second information is included in a radio resource control (RRC) connection reconfiguration message.

3. A method for supporting a sidelink communication by a base station, the method comprising:

receiving, from a terminal, capability information including first information indicating whether the terminal supports multiple transmissions of the sidelink communication to different destination terminals in a sidelink control (SC) period; and transmitting, to the terminal, configuration information for the multiple transmissions, wherein the multiple transmissions in the SC period is based on the configuration information, and wherein the configuration information includes second information indicating whether the multiple transmissions to the different destination terminals are to be performed by the terminal in the SC period.

4. The method of claim 3, wherein the second information includes information indicating that the multiple transmissions are to be performed.

5. The method of claim 1, wherein the second information is included in a radio resource control (RRC) connection reconfiguration message.

6. A terminal for performing a sidelink communication, the terminal comprising:

a transceiver; and a processor configured to:

control the transceiver to transmit, to a base station, capability information including first information indicating whether the terminal supports multiple transmissions of the sidelink communication to different destination terminals in a sidelink control (SC) period, control the transceiver to receive configuration information for the multiple transmissions, and perform the multiple transmissions in the SC period based on the configuration information, wherein the configuration information includes second information indicating whether the multiple transmissions to the different destination terminals are to be performed by the terminal in the SC period.

7. The terminal of claim 6, wherein the second information is included in a radio resource control (RRC) connection reconfiguration message.

8. A base station for supporting a sidelink communication, the base station comprising:

a transceiver; and a processor configured to:

control the transceiver to receive, from a terminal, capability information including first information indicating whether the terminal supports multiple

20 transmissions of the sidelink communication to different destination terminals in a sidelink control (SC) period, and control the transceiver to transmit to the terminal, configuration information for the multiple transmissions, wherein the configuration information includes second information indicating whether the multiple transmissions to the different destination terminals are to be performed by the terminal in the SC period.

9. The base station of claim 8, wherein the second information includes information indicating that the multiple transmissions are to be performed.

10. The base station of claim 8, wherein the second information is included in a radio resource control (RRC) connection reconfiguration message.

11. The method of claim 1, wherein the second information includes information indicating that the multiple transmissions are to be performed.

12. The terminal of claim 6, wherein the second information includes information indicating that the multiple transmissions are to be performed.

13. The method of claim 1, further comprising:

transmitting, to the base station, a request for resources for the sidelink communication; and receiving, from the base station, information about the resources for the sidelink communication.

14. The method of claim 13, wherein the performing of the multiple transmissions in a single SC period based on the configuration information further comprises:

performing the multiple transmissions to the different destination terminals in the SC period based on the resources in response that the second information indicates that the terminal is to perform the multiple transmissions to the different destination terminals in the SC period.

15. The method of claim 3, further comprising:

receiving, from the terminal, a request for resources for the sidelink communication; and transmitting, to the terminal, information about the resources for the sidelink communication.

16. The terminal of claim 6, wherein the processor is further configured to:

control the transceiver to transmit, to the base station, a request for resources for the sidelink communication, and control the transceiver to receive, from the base station, information about the resources for the sidelink communication.

17. The terminal of claim 16, wherein the processor is further configured to:

control the transceiver to perform the multiple transmissions to the different destination terminals in the SC period based on the resources in response that the second information indicates that the terminal is to perform the multiple transmissions to the different destination terminals in the SC period.

18. The base station of claim 8, wherein the processor is further configured to:

control the transceiver to receive, from the terminal, a request for resources for the sidelink communication, and control the transceiver to transmit, to the terminal, information about the resources for the sidelink communication.

19. The method of claim 1, wherein the SC period comprises a period over which resources allocated in a cell for transmissions of SC data and sidelink data occur.

20. The method of claim 1, wherein the SC period comprises a period from a time when SC data is generated to a time when next SC data is generated.

* * * * *